March 31, 1953 K. B. BREDTSCHNEIDER 2,633,151
PRESSURE RELEASING DEVICE
Filed April 25, 1951 4 Sheets-Sheet 1

INVENTOR
Kurt B. Bredtschneider
BY
ATTORNEY

March 31, 1953 K. B. BREDTSCHNEIDER 2,633,151
PRESSURE RELEASING DEVICE
Filed April 25, 1951 4 Sheets-Sheet 3

INVENTOR
Kurt B. Bredtschneider
BY *Donald J. Bell*
ATTORNEY

March 31, 1953  K. B. BREDTSCHNEIDER  2,633,151
PRESSURE RELEASING DEVICE
Filed April 25, 1951  4 Sheets-Sheet 4

INVENTOR
Kurt B. Bredtschneider
BY
ATTORNEY

Patented Mar. 31, 1953

2,633,151

UNITED STATES PATENT OFFICE 2,633,151

PRESSURE RELEASING DEVICE

Kurt B. Bredtschneider, Chicago, Ill., assignor to the United States of America as represented by the Secretary of the Interior Application April 25, 1951, Serial No. 223,692

9 Claims. (Cl. 137—613)

The invention herein described and claimed may be manufactured and used by or for the Government of the United States of America for governmental purposes without the payment of royalties thereon or therefor.

This invention is concerned with a device for releasing a fluid from a zone of relatively high pressure to a zone of relatively low pressure which is particularly suitable for releasing the pressure from fluids having erosive properties.

The problem of discharging a fluid from a zone of high pressure to a low pressure zone presents considerable difficulties when the fluid is of an erosive character, for example, where the fluid involved is a solids-in-gas suspension, or a solids-in-liquid suspension, or a solids-in-liquid suspension also containing dissolved gases. Because of the high pressure differentials involved, the erosive fluid tends to flow at extremely high velocities through the valves of ordinary pressure releasing mechanisms, thereby quickly ruining the valve surfaces. A number of devices have been previously suggested for releasing the pressure from erosive fluids which are constructed so as to avoid these abnormally high velocities of flow through the releasing valve, thereby avoiding the rapid deterioration of the valve. One such device is described in U. S. Patent No. 2,012,319 issued to Hermann Pittlick on August 27, 1935, and entitled Pressure Releasing Device. This device includes a cylinder, having a piston mounted for reciprocation therein, which serves as an intermediate chamber between the high pressure and low pressure zone for decompressing the high pressure fluid before it is discharged through the outlet valve to the low pressure zone. In order to avoid excessive velocities through the inlet valve which communicates with the high pressure zone, the inlet and outlet valves are opened and closed in timed relation with the reciprocations of the piston such that a portion of the decompressed fluid is retained in the cylinder, and recompressed to a pressure approximating that in the high pressure zone, before the inlet valve is opened to admit additional high pressure fluid to the cylinder.

Under normal conditions this device operates quite satisfactorily. However, if normal operations are disturbed, for example, by leakage of the inlet or outlet valves, or by a sudden change in the composition of the high pressure fluid, it sometimes happens that the desired pressure equalization across the inlet or outlet valve does not occur prior to the opening of the valve. Since in this prior device, the inlet and outlet valves are opened in a predetermined rhythm, irrespective of the pressure differential existing across the valve, under abnormal conditions of operation this prior device fails to prevent excessive velocities through the valves, and in some cases even permits the free access of the high pressure fluid through the cylinder to the low pressure zone.

The object of the present invention is to provide a pressure releasing device similar to the device described in the above identified patent, but free from the disadvantages connected with this prior device. More specifically, the object of the invention is to improve the safety of this prior device by assuring that when pressure equalization across the valves fails to take place because of some abnormal condition of operation, the valves will fail to open, and the device will come to a stop of itself.

These objects are accomplished in accordance with the present invention, by providing means for opening the inlet and outlet valves which exert controlled predetermined forces against these valves such that the valves are opened only when a predetermined permissible pressure differential exists across the valve. Thus, the opening of the valves does not depend upon any predetermined established rhythm but depends only upon the existence of a permissible pressure differential across the valve. The valve closing means, on the other hand, act against the forces tending to open the inlet and outlet valves, and cause these valves to close in a predetermined rhythm timed in accordance with the reciprocations of the piston.

For a fuller description and better understanding of the invention, reference is now made to the accompanying drawings wherein.

Figure 1:
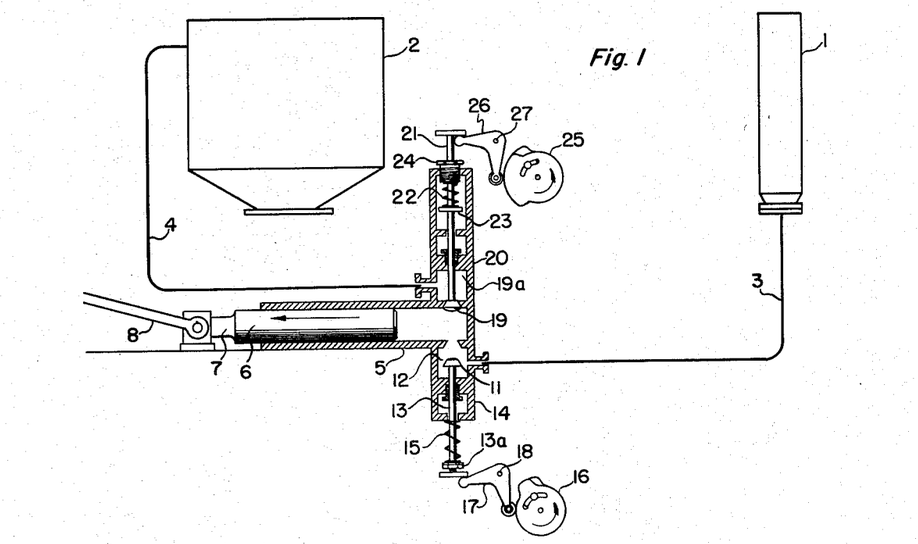
Fig. 1 is an illustration of one embodiment of the invention.

Referring now particularly to Fig. 1, reference numeral 1 refers to a high pressure vessel containing a fluid under high pressure and connected by line 3 to the inlet side of the pressure releasing device of the invention. Numeral 2 refers to a low pressure vessel for storing decompressed fluid and connected to the outlet side of the pressure releasing device by line 4. The pressure releasing device itself comprises a cylinder 5 equipped with a piston 6 mounted for reciprocation in the cylinder for producing alternating compression and expansion strokes. The piston 6 is connected by a piston rod 7, a connecting rod 8, a crank shaft 9, to a flywheel 10 (see Fig. 6).

An inlet valve 11, arranged in valve chamber 12 provides communication between the high pressure vessel 1 and the interior of the cylinder 5. Movement of the valve 11 is controlled by valve rod 13 which is mounted in a journal supported by valve casing 14. A spring 15, held in compression between valve casing 14 and a nut 13a on the lower end of the valve stem 13, exerts a predetermined force tending to force the valve 11 to the open position. A cam 16 operates a bell crank 17 pivoted at 18, one end of which follows the contour of cam 16, and the other end of which operates against the valve stem 13. This cam and bell crank system alternately closes the valve 11 against the opposing force of spring 15, and releases it at timed intervals during the operation of the device.

An outlet valve 19 at the top of the cylinder provides communication between the low pressure vessel 2 and the interior of the cylinder. Valve 19 is operated by a valve stem 21 journaled in valve casing 20. A spring 22, held in compression between shoulder 23 provided on the valve stem 21 and packing nut 24, exerts a predetermined force against the valve stem tending to force the valve 19 to the open position. A suitably contoured cam 25 operates a bell crank 26, pivoted at 27, for alternately closing the valve 19 against the force of spring 22 and releasing it at timed intervals during the operation of the device.

The amount of force exerted by springs 15 and 22 for biasing valves 11 and 19 respectively to the open position is adjusted so that these valves will only open when the pressure differential on opposite sides thereof is within predetermined permissible limits. In this way, if the differential pressure between the valve chamber 12 and the interior of the cylinder or the differential pressure between valve chamber 19a and the interior of the cylinder is excessive, such that an undesirably high velocity of flow through either of the valves would occur, the valves will remain closed. The maximum permissible differential pressure across either of the valves which will not result in erosive damage to the valve surfaces, of course, will depend upon the properties of the particular liquid being handled, and consequently the amount of opening force which the springs are permitted to exert will be governed accordingly.

The cams 16 and 25 rotate at the proper speed in accordance with the reciprocations of the piston 5 to insure the actuation of the valves 11 and 19 respectively at the proper intervals during the operating cycle. Preferably the rotation of the cams is controlled directly by the piston 5, each of the cams being connected to the piston through suitable mechanism to insure a constant relationship between the reciprocations of the piston and the operation of the cams.

To provide for adjustment of the operating cycle to accommodate fluids of varying composition the cam contour is preferably constructed so as to be capable of adjustment in a manner, for example, as is shown in the drawings. As will be apparent from the subsequently description, the timing of the inlet valve particularly depends upon the compressibility of the fluid being decompressed.

Reference is now made to Figs. 1 to 5, inclusive, which illustrates the embodiment shown in Fig. 1 in the various stages of its operating cycle. The reciprocation of the piston 6 in the cylinder produces alternate expansion strokes, when the piston moves to the left as viewed in the drawing, and compression strokes, as the piston moves to the right.

One complete cycle of the device includes an expansion and a compression stroke. During the first part of the expansion stroke, the inlet valve 11 is open and high pressure fluid flows into the cylinder. Before the completion of the expansion stroke, the inlet valve 11 is closed permitting the fluid in the cylinder to undergo decompression. Before the beginning of the compression stroke, the outlet valve opens, thus permitting the decompressed fluid in the cylinder to be discharged through the outlet valve 19 to the low pressure vessel 2. Before the end of the compression stroke, the outlet valve 19 is closed thus permitting residual fluid trapped in the cylinder to be recompressed to a pressure approximating that in the high pressure vessel 1. Near the end of the compression stroke, the inlet valve 11 opens again allowing excess fluid, if any, to be pushed back into the high pressure vessel. The inlet valve remains open when the device begins another cycle as the piston begins another expansion stroke, permitting an additional charge of high pressure fluid to be introduced into the cylinder.

In the embodiment shown power for reciprocating the piston 5 is furnished by the energy released during decompression of the high pressure fluid. Flywheel 10 stores sufficient energy to produce recompression of part of the decompressed fluid at the end of the compression stroke. Residual energy, if any, produced by the device can be utilized in any desired manner.

Fig. 1 shows the device at the beginning of the expansion stroke as high pressure fluid from vessel is introduced into the cylinder. The valve 11 is held open by spring 15, the cam 16 being in a position such that no closing force is exerted upon the valve 11. The piston 6 is moving to the left, allowing high pressure fluid to flow into the cylinder. Cam 25 has moved to a position such that valve 19 is positively held in the closed position.

Figure 2:
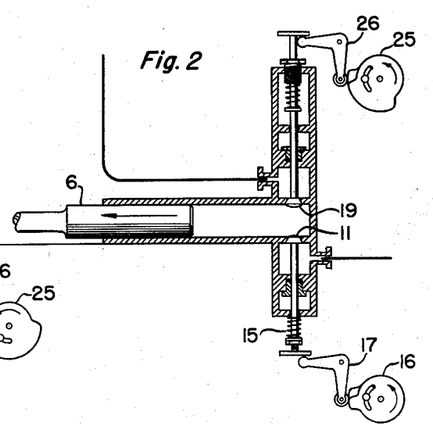
Figs. 2 to 5, inclusive, illustrate the operation of the embodiment shown in Fig. 1 at various stages in its operating cycle; and, Fig. 6 is an illustration of a second embodiment of the invention; and, Figs. 7 to 10, inclusive, illustrate the operation of the embodiment shown in Fig. 6 at various stages in its operating cycle; and, Fig. 11 is a diagram showing the operating cycle of a device constructed in accordance with the invention when operating under normal conditions; and, Fig. 12 is a diagram showing the operation of a device constructed in accordance with the invention when the inlet valve is leaking; and, Fig. 13 is a diagram showing the operation of a device according to the invention when the outlet valve is leaking.

Fig. 2 shows the device in a later part of the expansion stroke, with the piston 6 still moving to the left. The introduction of high pressure fluid into the cylinder has ceased, and decompression of the fluid in the cylinder has begun. The cam 16 has now moved to a position such that, through the action of bell crank 17 acting against the spring 15, valve 11 is closed. Outlet valve 19 is still held in a closed position by cam 25 and bell crank 26.

Figure 3:
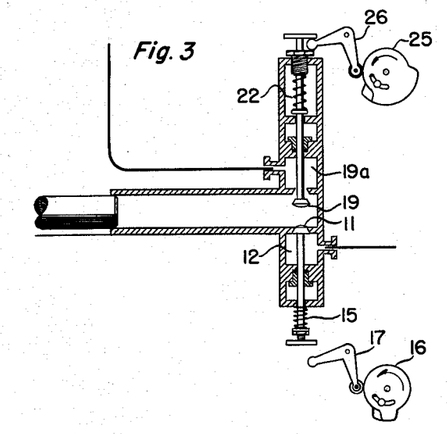

Fig. 3 shows the device at the end of the expansion stroke. The fluid in the cylinder has now been decompressed to a pressure approximating that in the low pressure vessel. The cam 25 has moved to a position such as to release the bell crank 26, permitting the valve 19 to be opened by the action of spring 22, provided the pressure differential between the valve chamber 19a and the interior of the cylinder is within permissible limits. In normal operation sufficient decompression will take place during the expansion stroke so that this will be the case, and valve 19 will open near the end of the expansion stroke as shown. The inlet valve 11 is held closed at this point by the differential pressure between the interior of the cylinder and valve chamber 12 which is greater than the opening force of spring 15. If desired, the inlet valve 11 at this point may be also held closed by the positive action of cam 16 and bell crank 17.

Figure 4:
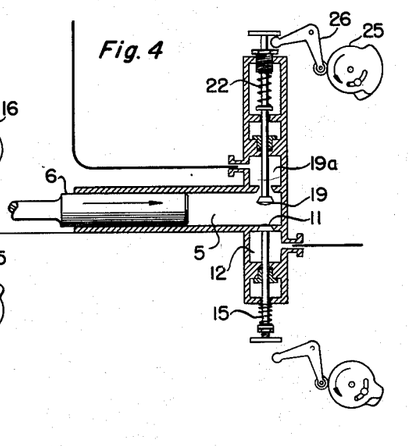

Fig. 4 shows the device during the first part of the compression stroke, with the piston 6 moving to the right causing decompressed fluid to be discharged through valve chamber 19a to the low pressure vessel. Cam 25 is still in a position such as to permit spring 22 to hold valve 19 in the open position. Inlet valve 11 is held in a closed position by the differential pressure between the interior of cylinder 5 and valve chamber 12 which is greater than the opening force of spring 15.

Figure 5:
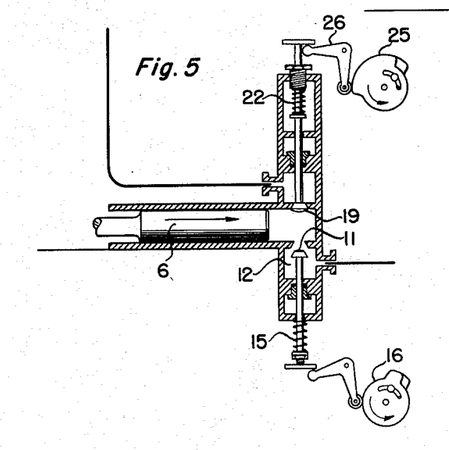

Fig. 5 shows the device toward the end of the compression stroke, with the piston 6 still moving towards the right. Cam 25 has moved to a position such as to cause the bell crank 26 to close valve 19 against the opening force of spring 22. This has occurred before all of the decompressed fluid has been discharged into vessel 1, thereby trapping residual fluid in the cylinder. As the piston 6 continues to move towards the right this residual fluid is recompressed until its pressure becomes approximately that of the fluid in the high pressure zone. When the pressure differential between the fluid in the cylinder and that in valve chamber 12 comes within predetermined permissible limits, the opening force exerted by spring 15 is sufficient to open the valve 11, cam 16 being in such a position as to permit this to occur. As shown in Fig. 5, valve 11 has just opened, and a small amount of residual fluid is being pushed back into the high pressure vessel 1. If for any reason (such as a leaky outlet valve) recompression of the fluid trapped in the cylinder should not occur, or only occur to a limited extent, such that the pressure differential between the fluid in the cylinder and the fluid in valve chamber 12 is excessive, the force exerted by spring 15 would not be sufficient to overcome this pressure differential and the valve 11 would not open.

Figure 11:
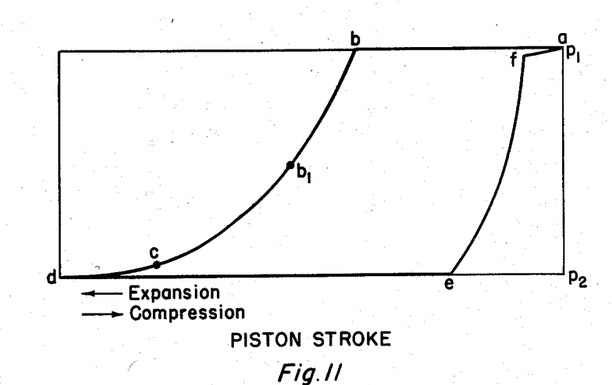

Reference is now made to Fig. 11 wherein piston strokes are plotted against pressure in the cylinder during a normal operating cycle. The pressure $p1$ corresponds to the pressure existing in the high pressure vessel and the pressure $p2$ corresponds to the pressure in the low pressure vessel. As the piston begins its expansion stroke at $a$, the pressure in the cylinder is equal to $p1$. From $a$ to $b$, as high pressure fluid is introduced into the cylinder through the inlet valve 11, the pressure in the cylinder remains equal to $p1$. At $b$, the inlet valve 11 is closed, decompression of the fluid in the cylinder begins, and pressure in the cylinder becomes smaller. From $b$ to $d$ decompression of the fluid in the cylinder continues until the pressure in the cylinder is equal to that in the low pressure zone. At some point before the end of the expansion stroke, such as $b1$, the cam 25 releases bell crank 26. The outlet valve 19, however, remains closed until point $c$ is reached where the differential pressure is not excessive. From $d$ to $e$, the decompressed fluid in the cylinder is discharged into the low pressure vessel 2. At $e$, the outlet valve 19 is closed. From $e$ to $f$ the residual fluid trapped in the cylinder is recompressed to a pressure approximately equal to $p1$. At point $f$, when the differential pressure between the cylinder and valve chamber 12 is not excessive, valve 11 is opened by spring 15. From $f$ to $a$ any residual recompressed fluid in the cylinder is pushed back into the high pressure vessel.

Figure 12:
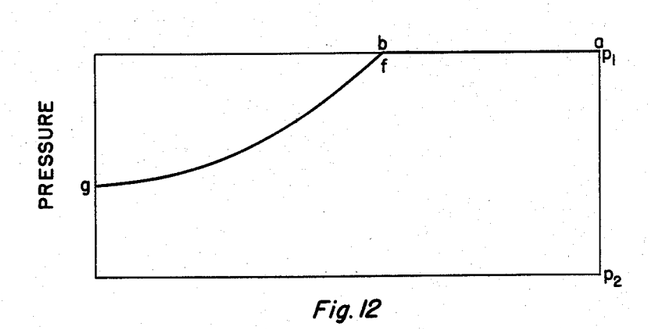

Reference is now made to Fig. 12 which shows the operation of the device in the event the inlet valve 11 should become damaged, permitting high pressure fluid to leak past it when in a closed position. $p1$ is equal to the pressure in the high pressure vessel and $p2$ is the pressure in the low pressure vessel. At point $a$, the piston begins its expansion stroke. The inlet valve 11 is open, and the pressure in the cylinder is equal to $p1$. At $b$, valve 11 is closed but high pressure fluid leaks past the valve. From $b$ to $g$ the material in the cylinder is decompressed, but pressure $p2$ is not attained since more high pressure fluid has leaked into the vessel past valve 11. Since the pressure in the cylinder at point $g$ is greater than the permissible differential pressure between the fluid in the cylinder and valve chamber 19a, spring 22 would not exert sufficient force to open the outlet valve and consequently the outlet valve 19 will remain closed. In this situation, in the case of the prior device described in the above identified U. S. patent, the outlet valve would have been opened regardless of the high pressure differential existing across the valve, thus permitting high pressure fluid in the cylinder to flow into the low pressure vessel with consequent damage to the valve surfaces, and perhaps damage or destruction of the low pressure lines. According to the invention however, the outlet valve 19 does not open, there is no discharge into the low pressure vessel. From $g$ to $f$, the fluid in the cylinder will be recompressed to its original pressure $p1$. Inlet valve 11 will then be opened by spring 15 and the material in the cylinder will be pushed back into the high pressure vessel. Since all the fluid which is decompressed to pressure $g$ is recompressed to its original pressure, there is no net decompression and consequently no release of energy. Consequently, the device will slow down and eventually stop of itself when the energy stored in the flywheel 10 is used up.

Figure 13:
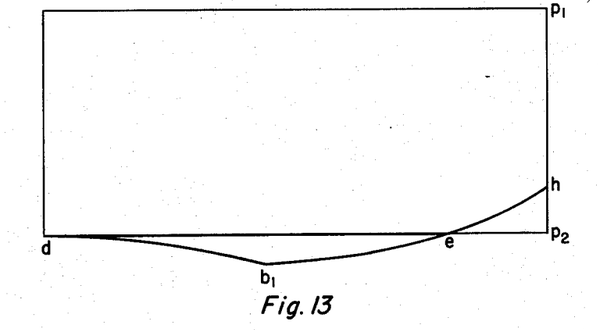

Reference is now made to Fig. 13 which shows the operation of the device in the event that the outlet valve 19 becomes damaged, permitting fluid to leak past it when in a closed position. At point $d$, at the beginning of the compression stroke, the outlet valve 19 is open, and the pressure in the cylinder equals $p2$. From $d$ to $e$, decompressed fluid is discharged into the low pressure vessel. At point $e$ the outlet valve 19 is closed but fluid leaks past the valve. From $e$ to $h$, compression of the fluid trapped in the cylinder to a pressure $h$ is obtained. Recompression to pressure $p1$ is not obtained because of the leaky valve 19. Since the presure differential between the fluid in the cylinder and the high pressure fluid in valve chamber 12 is greater than the permissible pressure differential, spring 15 will not open valve 11. In this same situation, in the case of the prior device referred to above, the valve 11 would have been opened regardless of the pressure differential existing across it, thus permitting high pressure fluid to flow directly into the low pressure vessel 1 through the leaky valve 19. With the device of the invention, however, the inlet valve 11 does not open and consequently high pressure fluid from vessel does not enter the cylinder. From $h$ to $e$, as the piston begins its expansion stroke, the residual fluid in the cylinder is decompressed back to the pressure $p2$. From $e$ to $b1$, depending upon the extent of leakage in the outlet valve 19, the pressure in the cylinder drops more or less below $p2$. At $b1$ the closing force on the outlet valve 19 is released by the cam 25, and valve 19 is opened by spring 22. As the piston completes the expansion stroke from $b1$ to $d$, the pressure in the cylinder becomes equal to $p2$. As in the previous case, there is no net decompression of the fluid, and consequently no energy released, and therefore, as in the previous case, the device will stop of itself when the energy of the flywheel 10 is used up.

Under other abnormal conditions of operation which result in the failure of the desired pressure equalization to take place across the inlet or outlet valve at the moment it is scheduled to open, the device will operate in a similar way to prevent the valve from opening. For example, if for some reason there is a change in the composition of the fluid being released, such, for example, as an increase in the pressure of a gas being released, the outlet valve will fail to open if the expansion stroke is too short to sufficiently decompress the gas. Similarly, if, when releasing a fluid consisting of a liquid containing dissolved gases under high pressure, for some reason there is an increase in the amount of gas that is dissolved in the liquid, the outlet valve will likewise fail to open if the expansion stroke is too short to sufficiently decompress the mixture of gas and liquid.

Any suitable means, other than springs as shown in the embodiment illustrated in Figs. 1 to 5 may be employed for exerting predetermined forces on the inlet and outlet valves tending to bias them to the open position. For example, instead of springs, weights, attached to valve stems 21 and 13, respectively, may be employed to exert these predetermined forces.

A still different arrangement is shown in Figs. 6 to 10, inclusive, where the predetermined forces for opening the inlet and outlet valves are supplied by pistons operated by fluid from the high pressure and low pressure zones, respectively.

Figure 6:
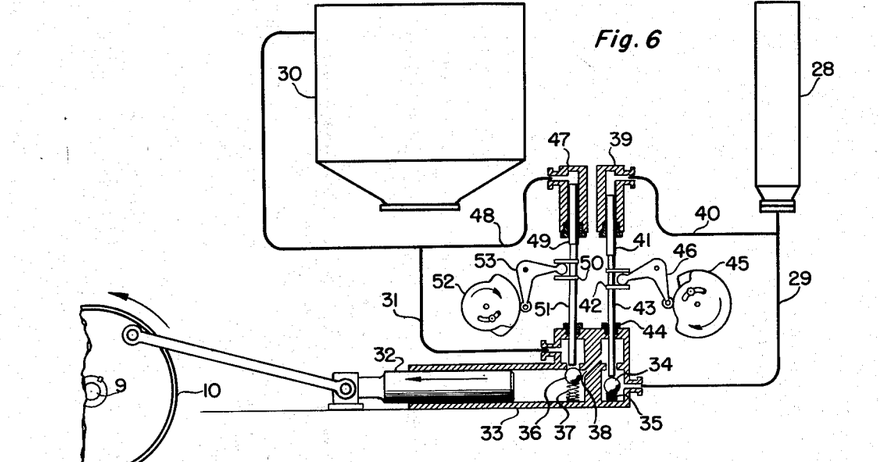

Referring now particularly to Fig. 6, reference numeral 28 refers to a high pressure vessel connected by line 29 to the intake side of the pressure releasing device. A low pressure vessel 30 is connected by line 31 to the outlet side of the device. As in the previously described embodiment, the pressure releasing device comprises a cylinder 33 having a piston 32 mounted for reciprocation therein. The piston 32 is connected to a flywheel in the same manner as in the previously described embodiment. The inlet device is of the ball check type, including a ball 34 and a spring 35 for forcing the ball against the valve seat. The outlet valve is likewise of the ball check type, including ball 36 biased against the valve seat by spring 37. If desired, any other convenient type of check valve may be used, such as a disk check valve in place of the ball check valves shown. A passage 38 provides communication between the outlet and inlet valves, and between the inlet valve and the interior of the cylinder.

Above the inlet valve, a cylinder 39 is provided, connected by line 40 to the high pressure vessel 28. A piston 41, suitably packed, slides in the cylinder 39. At its lower end, the piston 41 is fastened to a crankslide 42. Crankslide 42 is in turn fastened to a push rod 43 which extends through a suitable gland 44, and is positioned so as to depress the ball 34 when the piston 41 moves downwardly. A suitably contoured cam 45 operates a bell crank 46 the opposite end of which operates in crankslide 42. The cross-sectional area of piston 41, of the rod 43, and the ball 34, and the size of the inlet valve opening, are so proportioned in relation to one another that the piston 41, which is actuated by fluid pressure from the high pressure vessel 28, will exert a force against the ball check valve 34 sufficient to open it only when a predetermined permissible pressure differential exists across the valve. It is clear of course that the piston 41 must exert at least enough force to overcome stuffing box friction and the force exerted by spring 35.

The cam 45 is properly contoured and rotates at the proper rate in timed relation with the reciprocations of the piston 32, such that at proper intervals during the operation of the device, the piston 41 is pushed upwardly against the force of the high pressure fluid exerted against it, thus permitting the inlet valve to be closed by the action of spring 35. Likewise, at the proper intervals, the cam 45 releases the piston 41 allowing it to open the inlet valve 34 if the pressure differential is not excessive.

Above the outlet valve, a second cylinder 47 is provided, connected to low pressure vessel 30 by line 48, and having a piston 49 mounted for reciprocation therein. Fastened to the lower end of piston 49 is a crankslide 50 and push rod 51. The push rod acts in a similar manner to the push rod 43 to open the outlet valve by depressing ball 36 against the opposing force of spring 37. The piston 49, push rod 51, ball 36, and the size of the outlet valve opening, are so proportioned that push rod 51 will exert a force such as to open the outlet valve only when the pressure differential across the valve is within predetermined permissible limits.

A cam 52 operates a bell crank 53, one end of which follows the cam contour, and the other end of which operates in crankslide 50. The cam 52 is properly contoured, and rotates at the proper rate in timed relation with the reciprocations of the piston 32, so that at the proper intervals, the piston 49 is pushed upwardly against the force exerted by fluid from vessel 30, thus permitting the outlet valve to be closed by the action of spring 37. Likewise, at the proper intervals, through the action of the cam 52, piston 49 is released so that it can open the outlet valve if the pressure differential across the outlet valve is not excessive.

The operation of the device shown in Figs. 6 to 10, inclusive, is similar to the operation of the previously described embodiment. Each cycle comprises an expansion and compression stroke. Fig. 6 shows the device shortly after the beginning of the expansion stroke the inlet valve 34 being open, and the outlet valve 36 being closed. High pressure fluid from vessel 28 flows into the cylinder through the inlet valve.

Figure 7:
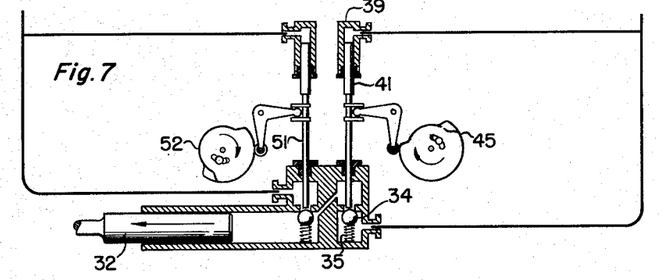

Fig. 7 shows the device during a later part of the expansion stroke, the piston 32 still moving to the left. The cam 45 has pushed the piston 41 upwardly against the fluid pressure in cylinder 39, thereby releasing the ball 34 allowing spring 35 to close the inlet valve. Cam 52 holds push rod 51 away from the outlet valve. At this point, decompression of the fluid in the cylinder begins.

Figure 8:
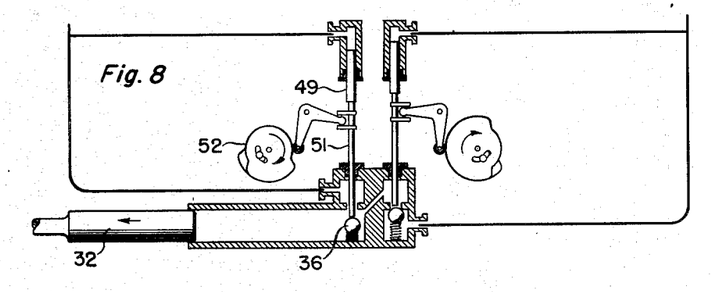

Fig. 8 shows the device near the completion of its expansion stroke, the piston 32 still moving towards the left. The inlet valve is still closed, but cam 52 has released the piston 49 allowing push rod 51 to open the outlet valve by depressing the ball 36.

Figure 9:
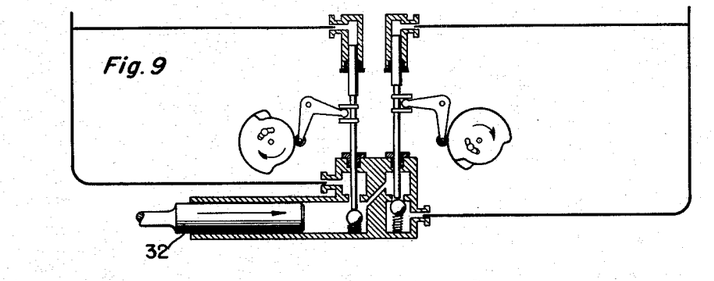

Fig. 9 shows the device in the first part of its compression stroke, with the piston 32 moving towards the right, discharging decompressed fluid through the open outlet valve into the vessel 30.

Figure 10:
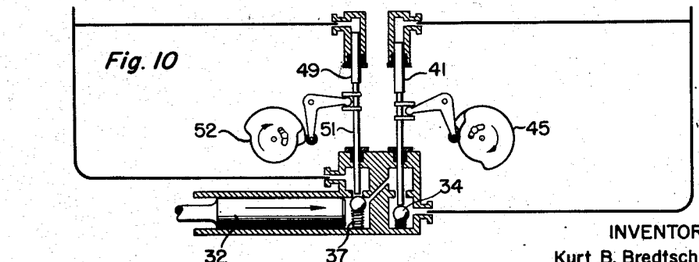

Fig. 10 shows the device towards the end of its compression stroke with the piston 32 still moving towards the right. Shortly before, cam 52 has raised push rod 51, thus permitting the spring 37 to close the outlet valve. The residual liquid trapped in the cylinder has been recompressed to a pressure approximately that of the fluid in the high pressure vessel. Cam 45 has moved to a position such as to release the piston 41 allowing it to open the outlet valve by depressing the ball 34. During the remainder of the compression stroke, any residual fluid flows back into the high pressure vessel.

It is apparent of course, that if normal operation should be disturbed, and for some reason equalization across either the inlet or outlet valve fails to take place at the moment when either of these valves would ordinarily open, these valves will fail to open and the device will automatically come to a stop as in the previously described embodiment.

As previously stated, the device of the invention is particularly suitable for releasing pressure from fluids having erosive properties. For example, the device of the invention will be found particularly useful in plants for the conversion of coal into hydrocarbons by high pressure hydrogenation according to the so-called Bergius process. In this process, the coal, carried in a heavy oil vehicle is subjected to treatment with hydrogen at pressures in the order of 10,000 to 20,000 pounds per square inch. In the course of this process, a heavy asphaltic oil is formed which is collected in a vessel called the "hot catchpot" where it is stored temporarily under an atmosphere of hydrogen at a pressure of 10,000 to 20,000 pounds per square inch. This heavy oil containing dissolved hydrogen, also contains the ash content of the coal and catalyst particles suspended therein. Due to the high pressures involved and the erosive character of this heavy oil, it is quite difficult to let down to atmospheric pressure. Using the device of the invention however, this can be accomplished safely and with little wear and tear on the pressure release mechanism. Furthermore, in a large plant, usable amount of energy released by decompression of the heavy oil may be recovered.

When releasing a liquid containing dissolved gas under high pressure, the amount of decompression necessary to reach a specified lower pressure will depend chiefly upon the amount of gas dissolved in the liquid. In utilizing the device of the invention for releasing a mixture of this type, the amount of decompression can readily be adjusted by altering the contour of the cam controlling the inlet valve so as to close the inlet valve at the proper time during the expansion stroke. The sooner the inlet valve is closed during the expansion stroke, the greater amount of decompression will take place, and conversely.

When releasing a liquid containing dissolved gases under high pressure, it is preferable that at least the outlet valve be located at the top of the cylinder as in the two embodiments described above. In this way, if any residual pressure differential within the permissible limits exists within the cylinder, the gas which collects at the top of the cylinder may vent itself first at a relatively high velocity, releasing this residual pressure without causing wear on the valve. The erosive liquid which collects at the bottom of the cylinder is then pushed out by the piston at a relatively low velocity.

It is to be understood that the above description, together with the specific examples and embodiments described, is intended merely to illustrate the invention, and that the invention is not to be limited thereto, nor in any way except by the scope of the appended claims.

I claim:

1. A device for releasing a fluid from a zone of relatively high pressure to a zone of relatively low pressure comprising a cylinder, a piston mounted for reciprocation in said cylinder for producing alternating expansion and compression strokes, an inlet valve for admitting a fluid under relatively high pressure into said cylinder, an outlet valve for releasing said fluid in a decompressed condition from said cylinder to a zone of relatively low pressure, means for exerting predetermined forces against said inlet and outlet valves for causing said valves to open only when the pressure differential across said valves is within predetermined permissible limits, means operated in timed relation with the reciprocations of said pistons for closing and releasing said inlet and outlet valves at timed intervals during the reciprocations of said piston.

2. A device for releasing a fluid from a zone of relatively high pressure to a zone of relatively low pressure comprising a cylinder, a piston mounted for reciprocation in said cylinder for producing alternating expansion and compression strokes, an inlet valve for admitting a fluid under relatively high pressure into said cylinder, an outlet valve for releasing said fluid in a decompressed condition from said cylinder to a zone of relatively low pressure, means exerting predetermined forces against said inlet and outlet valves for causing said valves to open only when the pressure differential across said valves is within predetermined permissible limits, means acting against the force tending to open said inlet valve for causing said inlet valve to close prior to the completion of each expansion stroke, means acting against the force tending to open said outlet valve for causing said outlet to close prior to the completion of each compression stroke.

3. A device for releasing a fluid from a zone of relatively high pressure to a zone of relatively low pressure comprising a cylinder, a piston mounted for reciprocation in said cylinder for producing alternating expansion and compression strokes, an inlet valve for admitting fluid under relatively high pressure into said cylinder, an outlet valve for releasing said fluid in a decompressed condition from said cylinder to a zone of relatively low pressure, means exerting predetermined forces against said inlet and outlet valves for causing said valves to open only when the pressure differential across said valves is within predetermined permissible limits, means acting against the force tending to open said inlet valve for causing said inlet valve to close prior to the completion of each expansion stroke, means for releasing said inlet valve closing means prior to the completion of each compression stroke, means acting against the force tending to open said outlet valve for causing said outlet valve to close prior to the completion of each compression stroke, and means for releasing said outlet valve closing means prior to the completion of each expansion stroke.

4. A device for releasing a fluid from a zone of relatively high pressure to a zone of relatively low pressure comprising a cylinder, a piston mounted for reciprocation in said cylinder for producing alternating expansion and compression strokes, an inlet valve for admitting a fluid under relatively high pressure into said cylinder, an outlet valve for releasing said fluid in a decompressed condition from said cylinder to a zone of relatively low pressure, means exerting predetermined forces against said inlet and outlet valves for causing said valves to open only when the pressure differential across said valves is within predetermined permissible limits, means acting against the force tending to open said inlet valve for causing said inlet valve to close prior to the completion of each expansion stroke, means for releasing said inlet valve closing means prior to the completion of each compression stroke, means acting against the force tending to open said outlet valve for causing said outlet valve to close prior to the completion of each compression stroke, means for releasing said outlet valve closing means prior to the completion of each expansion stroke, said means for closing and releasing said inlet and outlet valves including cams operated in timed relation with the reciprocations of said piston.

5. A device for releasing a fluid from a zone of relatively high pressure to a zone of relatively low pressure comprising a cylinder, a piston mounted for reciprocation in said cylinder for producing alternating expansion and compression strokes, an inlet valve for admitting a fluid under relatively high pressure into said cylinder, an outlet valve for releasing said fluid in a decompressed condition from said cylinder to a zone of relatively low pressure, means exerting a predetermined force against said inlet valve for opening said valve prior to the beginning of each expansion stroke, said opening force being adjusted so as to cause said inlet valve to open only when the pressure differential across said inlet valve is within predetermined permissible limits, means acting against the force tending to open said inlet valve for causing said inlet valve to close prior to the completion of each expansion stroke, means exerting a predetermined force against said outlet valve for opening said valve prior to the beginning of each compression stroke, said opening force being adjusted so as to cause said outlet valve to open only when the pressure differential across said outlet valve is within predetermined permissible limits, means acting against the force tending to open said outlet valve for causing said outlet valve to close prior to the completion of each compression stroke.

6. A device for releasing a fluid from a zone of relatively high pressure to a zone of relatively low pressure comprising a cylinder, a piston mounted for reciprocation in said cylinder for producing alternating expansion and compression strokes, an inlet valve for admitting a fluid under relatively high pressure into said cylinder, an outlet valve for releasing said fluid in a decompressed condition from said cylinder to a zone of relatively low pressure, means exerting a predetermined force against said inlet valve for opening said valve prior to the beginning of each expansion stroke, said opening force being adjusted so as to cause said inlet valve to open only when the pressure differential across said inlet valve is within predetermined permissible limits, means acting against the force tending to open said inlet valve for causing said inlet valve to close prior to the completion of each expansion stroke, means for releasing said inlet valve closing means prior to the completion of each compression stroke, means exerting a predetermined force against said outlet valve for opening said valve prior to the beginning of each compression stroke, said opening force being adjusted so as to cause said outlet valve to open only when the pressure differential across said outlet valve is within predetermined permissible limits, means acting against the force tending to open said outlet valve to cause said outlet valve to close prior to the completion of each compression stroke, and means for releasing said outlet valve closing means prior to the completion of each expansion stroke.

7. A device for releasing a fluid from a zone of relatively high pressure to a zone of relatively low pressure comprising a cylinder, a piston mounted for reciprocation in said cylinder for producing alternating expansion and compression strokes, an inlet valve for admitting a fluid under relatively high pressure into said cylinder, an outlet valve for releasing said fluid in a decompressed condition from said cylinder to a zone of relatively low pressure, means exerting a predetermined force against said inlet valve for opening said valve prior to the beginning of each expansion stroke so as to permit fluid from said high pressure zone to be introduced into said cylinder, said opening force being adjusted so as to cause said inlet valve to open only when the pressure differential across said inlet valve is within predetermined permissible limits, means acting against the force tending to open said inlet valve for causing said inlet valve to close prior to the completion of each expansion stroke so as to permit said fluid to undergo decompression in said cylinder, means exerting a predetermined force against said outlet valve for opening said valve prior to the beginning of each compression stroke so as to permit the discharge of said decompressed fluid to said low pressure zone, said opening force being adjusted so as to cause said outlet valve to open only when the pressure differential across said outlet valve is within predetermined permissible limits, means acting against the force tending to open said outlet valve for causing said outlet valve to close after the bulk of said decompressed fluid has been discharged into said low pressure zone but prior to the completion of the compression stroke so as to permit residual fluid in said cylinder to be recompressed to a pressure approximating the pressure in said high pressure zone.

8. A device for releasing a fluid from a zone of relatively high pressure to a zone of relatively low pressure comprising a cylinder, a piston mounted for reciprocation in said cylinder for producing alternating expansion and compression strokes, an inlet valve for admitting a fluid under relatively high pressure into said cylinder, an outlet valve for releasing said fluid in a decompressed condition from said cylinder to a zone of relatively low pressure, means exerting a predetermined force against said inlet valve for opening said valve prior to the beginning of each expansion stroke so as to permit fluid from said high pressure zone to be introduced into said cylinder, said opening force being adjusted so as to cause said inlet valve to open only when the pressure differential across said inlet valve is within predetermined permissible limits, means acting against the force tending to open said inlet valve for causing said inlet valve to close prior to the completion of each expansion stroke so as to permit said fluid to undergo decompression in said cylinder, means exerting a predetermined force against said outlet valve for opening said valve prior to the beginning of each compression stroke so as to permit the discharge of said decompressed fluid to said low pressure zone, said opening force being adjusted so as to cause said outlet valve to open only when the pressure differential across said outlet valve is within predetermined permissible limits, means acting against the force tending to open said outlet valve for causing said outlet valve to close after the bulk of said decompressed fluid has been discharged into said low pressure zone, but prior to the completion of the compression stroke, so as to permit the residual fluid in said cylinder to be recompressed to a pressure approximating the pressure in said high pressure zone, means for releasing said inlet valve closing means prior to the completion of each compression stroke, and means for releasing said outlet valve closing means prior to the completion of each expansion stroke.

9. A device for releasing a fluid from a zone of relatively high pressure to a zone of relatively low pressure comprising a cylinder, a piston mounted for reciprocation in said cylinder for producing alternating expansion and compression strokes, an inlet valve for admitting a fluid under relatively high pressure into said cylinder, an outlet valve for releasing said fluid in a decompressed condition from said cylinder to a zone of relatively low pressure, means including a piston actuated by high pressure fluid from said high pressure zone for exerting a predetermined force against said inlet valve for opening said valve prior to the beginning of each expansion stroke so as to permit fluid from said high pressure zone to be introduced into said cylinder, said opening force being adjusted so as to cause said inlet valve to open only when the pressure differential across said inlet valve is within predetermined permissible limits, means acting against the force tending to open said inlet valve for causing said inlet valve to close prior to the completion of each expansion stroke so as to permit said fluid to undergo expansion in said cylinder, means including a piston actuated by decompressed fluid from said low pressure zone for exerting a predetermined force against said outlet valve for opening said valve prior to the beginning of each compression stroke so as to permit the discharge of said decompressed fluid to said low pressure zone, said opening force being adjusted so as to cause said outlet valve to open only when the pressure differential across said outlet valve is within predetermined permissible limits, means acting against the force tending to open said outlet valve for causing said outlet valve to close after the bulk of said decompressed fluid has been discharged into said low pressure zone but prior to the completion of the compression stroke so as to permit the residual fluid in said cylinder to be recompressed to a pressure approximating the pressure in said high pressure zone.

KURT B. BREDTSCHNEIDER.

REFERENCES CITED

The following references are of record in the file of this patent:

UNITED STATES PATENTS

| Number | Name | Date |
|---|---|---|
| 2,012,319 | Pittlick | Aug. 27, 1935 |